United States Patent [19]

Nakano et al.

[11] Patent Number: 4,861,612

[45] Date of Patent: Aug. 29, 1989

[54] METHOD OF SEPARATING OLEAGINOUS MATTER INTO COMPONENTS HAVING VARIOUS MELTING POINTS

[75] Inventors: Akira Nakano, Hazakimachi; Hiroshi Higashioka, Ibaraki; Masaki Nomura, Hazakimachi; Yoshiharu Kawahara, Sahara; Ko Yamashita; Yoshito Sano, both of Hazakimachi; Minoru Kase, Choshi, all of Japan

[73] Assignee: Kao Corporation, Tokyo, Japan

[21] Appl. No.: 149,733

[22] Filed: Jan. 29, 1988

[30] Foreign Application Priority Data

| | | | |
|---|---|---|---|
| Feb. 6, 1987 | [JP] | Japan | 62-25855 |
| Feb. 6, 1987 | [JP] | Japan | 62-25856 |
| Aug. 10, 1987 | [JP] | Japan | 62-199382 |
| Sep. 22, 1987 | [JP] | Japan | 62-238382 |

[51] Int. Cl.[4] ........ A23D 5/00

[52] U.S. Cl. ........ 426/607; 426/608; 426/417; 562/606

[58] Field of Search ........ 426/601, 607, 608, 417; 562/606

[56] References Cited

U.S. PATENT DOCUMENTS

| | | | |
|---|---|---|---|
| 3,884,046 | 5/1975 | Schmidt et al. | 62/58 |
| 3,950,371 | 4/1976 | Jeromin et al. | |
| 4,049,687 | 9/1977 | Rek | |
| 4,127,597 | 11/1978 | Craig, Jr. et al. | 426/607 |
| 4,479,976 | 10/1984 | Lansbergen et al. | 426/607 |

FOREIGN PATENT DOCUMENTS

| | | | |
|---|---|---|---|
| 0069599 | 1/1983 | European Pat. Off. | 426/607 |
| 50-94003 | 7/1975 | Japan | |
| 50-132009 | 10/1975 | Japan | |
| 51-15048 | 5/1976 | Japan | |
| 57-195 | 1/1982 | Japan | |
| 57-196 | 1/1982 | Japan | |
| 58-24480 | 5/1983 | Japan | |
| 58-198423 | 11/1983 | Japan | |
| 59-21919 | 5/1984 | Japan | |
| 1490551 | 11/1977 | United Kingdom | |

*Primary Examiner*—Marianne Cintins

*Attorney, Agent, or Firm*—Flynn, Thiel, Boutell & Tanis

[57] ABSTRACT

Oleaginous material is fractionated into two fractions having different melting points from each other by emulsifying all the oleaginous material with water and using with a surfactant having an HLB value of 5 to 10 as an emulsifier, at a temperature at which all the oleaginous material is substantially melted. The emulsion is cooled to a temperature at which one fraction of the oleaginous material crystallizes so that the emulsion forms a lighter phase containing the other fraction of the oleaginous material and a heavier phase comprising an aqueous phase containing crystals of said first fraction dispersed therein. The lighter phase is separated from the heavier phase and then the crystals of the first fraction are separated from the remainder of the heavier phase.

14 Claims, No Drawings

METHOD OF SEPARATING OLEAGINOUS MATTER INTO COMPONENTS HAVING VARIOUS MELTING POINTS

This invention relates to a method of separating oleaginous matter into components having various melting points for the purpose of effective use of oleaginous matter comprising components having various melting points, such as fats or fatty acids.

The invention further provides a new liquid oil which is useful for an edible oil.

In order to effectively use oleaginous matter comprising components having various melting points, separation thereof into components having various melting points has been hitherto conducted, and various separation methods have been studied. The most fundamental method among them is wintering. Although this method can be conducted at the lowest cost, it is poor in the solid-liquid separation efficiency because a large amount of the liquid component is incorporated in a solid component, and an increase in the solid component content brings about an increase in the viscosity and further the solidification of the whole, which makes it difficult to conduct solid-liquid separation. Thus this method has a drawback that it can be used only in a limited scope of application. Particularly, this method cannot be used as a separation method for preparing a solid component.

Solvent fractionation which uses a solvent is known as a method capable of eliminating this drawback. In this method, the use of a solvent brings about a lowering in the proportion of the solid component, i.e., enables a decrease in the viscosity. Therefore, this method is advantageous in that it can be used even when the solid component content is high and that the washing with the solvent makes it possible to obtain a high-quality solid component containing no significant amount of a liquid component incorporated therein. Thus this method offers a fractionation method effective in obtaining a solid component. However, in this method, the quality of the liquid component is lowered since part of the solid component dissolves in the solvent to remain in the liquid component. Further, the use of the solvent not only causes the lowering in the separation temperature but also requires the provision of a solvent recovering apparatus and the explosion-proof construction of the system as a whole. These unfavorably lead to an increase in cost with respect to not only energy but also facilities.

Besides these two methods, wetting agent fractionation which uses a wetting agent (surfactant) is known in the art (see Japanese Patent Publication No. 9986/1956). This method comprises allowing an aqueous solution of a wetting agent (in many cases containing an inorganic electrolyte for the purpose of preventing emulsification) to act on a solid component and a liquid component which are in a mixed state to allow the solid component to migrate and suspend in the aqueous solution of a wetting agent, thereby dividing the mixture into two phases, having different specific gravities from each other, i.e., a lighter phase comprising a liquid component and an aqueous phase containing the solid component suspended therein, separating the two phases from each other by centrifugation or the like, and separating the suspended solid component from the aqueous phase portion, thereby separating starting oleaginous matter into a solid component and a liquid component. This method is less costly than the solvent fractionation and less susceptible to the contamination of the liquid component with the solid component as compared to the solvent fractionation, which enables a high-quality liquid component to be obtained. Therefore, this method is used in the fractionation of palm oil (the separation of palm stearin from palm olein). However, in this method, the solid-liquid separation efficiency is unsatisfactory because the liquid component cannot be sufficiently incorporated in the solid component, which makes it impossible to obtain a solid component having high quality comparable to the quality attained by the solvent fractionation. Thus this method is a mere compromise between the wintering and the solvent fractionation in cost, quality and separation efficiency and therefore is not a satisfactory method.

Various studies have hitherto been made on wetting agents for use in the wetting agent fractionation. For example, Japanese Patent Publication No. 9986/1956 discloses the use of alkylbenzenesulfonates, alkylsulfonates, salts of sulfated alcohols, and soap. Japanese Patent Laid-Open Nos. 94003/1975 and 132009/1975 disclose the use of soap derived from a free fatty acid contained in fats. Further, Japanese Patent Laid-Open Nos. 195/1982, 196/1982, and 198432/1983, Japanese Patent Publication No. 21919/1984 disclose the use of alkylsulfonates or soap in combination with sorbitan fatty acid esters, adducts or sorbitan fatty acid esters with polyoxyethylene (number of moles of addition of ethylene oxide: 20 to 30), sucrose fatty acid esters or monoglycerides.

Thus, most of the wetting agents which have been hitherto used comprise a water-soluble anionic surfactant alone or in combination with other surfactant. The HLB value of this kind of anionic surfactant is high, e.g., 40 in the case of sodium lauryl sulfate and 18 in the case of sodium oleate.

Japanese Patent Publication No. 9986/1956 describes an example of a fractionation method which uses a monoglyceride. This monoglyceride contains soap in an amount as large as 14%. Therefore, this example corresponds to the combined use of soap and a monoglyceride.

Japanese Patent Publication No. 24480/1983 describes that when the cooling for crystallization is conducted in an emulsified state in the presence of an aqueous solution of a wetting agent, the wetting agent hinders the precipitation and growth of the crystals and that consequently this makes it difficult to separate a lighter phase comprising the liquid component from an aqueous phase containing the solid component suspended therein.

On the other hand, among wetting agent fractionation methods which have been hitherto conducted, a method in which crystallization is conducted in a non-emulsion system as disclosed in Japanese Patent Publication Nos. 9986/1956 and 21919/1984 and Japanese Patent Laid-Open No. 94003/1975, i.e., a method which comprises sufficiently crystallizing and ripening (effecting cohesion and growth) a solid component to be separated in a liquid component which serves as a matrix for precipitation and then treating the solid component with an aqueous solution of a wetting agent to allow the crystal to migrate and suspend into an aqueous phase has the following drawback. Specifically, in this method, since the crystallization and the ripening (cohesion and growth) are conducted in the liquid component, the liquid component is entrapped in the crystals and the matrix between the crystals, and the solid component is allowed to migrate and suspend into the water phase in that state, which brings about the contamination of the solid component with the liquid component, thus leading to not only the lowering in the purity of the solid component but also the lowering in the separation efficiency.

Examples of other known methods include a method in which cooling and crystallization are conducted in an O/W emulsion in the presence of a wetting agent (see Japanese Patent Publication Nos. 7911/1964, 35272/1971, 15048/1976, and 24480/1983). However, all of these methods use an oil/water emulsion system for the purpose of improving the cooling efficiency and hardly contribute to an improvement in the separation efficiency. The reason for this is not fully elucidated but is believed to reside in the following facts. Specifically, in the oil/water emulsion system, the solid component is crystallized in the dispersed phase composed of oil droplets and allowed to migrate and suspend into the water phase as a continuous phase where the solid component is ripened. The ripening (cohesion and growth) of the crystals of the solid component is conducted in the aqueous phase of any of the cases where the emulsion system is of a water/oil type or an oil/water type. When the initial emulsion system is of a water/oil type, the emulsion system is converted into a crystal/water-/oil double emulsion system after the precipitation of the crystals, and the crystals and the liquid components are completely separated from water. On the other hand, when the initial emulsion system is of an oil/water type, the emulsion system is converted into an (oil+-crystal)/water emulsion system, which causes the re-association (secondary contact) of the crystals with oil droplets which are also in the dispersed state during the ripening (cohesion and growth). Since this brings about the inclusion of the liquid component, the liquid component gets mixed in the solid component, which leads to the lowering in the solid component. This makes the separation efficiency inferior to that in the case of crystallization in the water/oil emulsion system.

As described above, the fractionation methods which are known at present have their own drawbacks and therefore used according to the purposes. For this reason, the development of a fractionation method which enables high quality solid and liquid components to be obtained in a high yield and low cost is demanded in order to attain a high degree of effective use of oleaginous matter through the separation thereof into components having various melting points.

The present inventors have made extensive and intensive studies on a wetting agent (surfactant) used in the wetting agent fractionation with a view to developing a fractionation method which enables high-quality liquid and solid components to be obtained from oleaginous matter in a high yield and low cost. As a result, the present inventors have found that the use of a surfactant having an HLB value (hydrophilic-lipophilic balance) of 5 to 12 as the wetting agent suppresses the intermingling of the liquid component and the solid component with each other and enables the fractionation of high-quality liquid and solid components in a high yield and a low cost, which led to the completion of the present invention.

The present inventors have made studies on a relationship between the crystal wetting capability (i.e. capability of allowing crystals to wet and migrate and suspend into an aqueous phase) which is a basis of the wetting agent fractionation method and the HLB value which is indicative of the surface activity of the wetting agent. As a result, the present inventors have found that not only water-soluble surfactants having a high HLB value, such as alkylsulfonates and soap which have been hitherto used, but also surfactants having an HLB value of 5 to 12, preferably 6 to 10, which are suitably balanced in respect of hydrophilicity and lipophilicity and easily dissolved (or dispersed) in water as well as an oil, have crystal wetting capability. Further, the present inventors have surprisingly found that the wetting agent fractionation by making use of a surfactant having an HLB value of 5 to 12 as the wetting agent according to the present invention causes no contamination of the solid component with the liquid component as opposed to the conventional method which uses a water-soluble surfactant having a high HLB value and enables the fractionation of a high-quality solid component comparable in quality and yield to the solid component obtained by the solvent fractionation.

Although there are many unknown factors about the mechanism of the wetting of the crystal with the wetting agent of the present invention, it is believed to be important that the wetting agent has a combination of hydrophilicity with lipophilicity and can be dissolved or dispersed in both the water side and the oil side in the presence of water in combination with an oil. For example, when the HLB value is less than 5, the wetting agent is substantially dissolved or dispersed in the oil side in the presence of water in combination with an oil and can cause no migration of the crystal into the aqueous phase. On the other hand, when the HLB value exceeds 12, the wetting agent is substantially dissolved or dispersed in the water side. Therefore, in order that the wetting agent may be present in the water side and may cause the migration of the crystal present in the oil phase into the aqueous phase, it is necessary that the wetting agent have a strong surface activity (cf., e.g., an HLB value of sodium oleate: 18). It is believed that the crystal wetting capability is very poor when the HLB value is about 12 to 15.

The invention provides a method for fractionating oleaginous matters having different melting points from one another into two fractions having different melting points from each other, which comprises the steps of:

emulsifying all the oleaginous matters with water with a wetting agent of a surfactant having an HLB value of 5 to 12 at a temperature where all the matters substantially melt, then cooling the emulsion down to a temperature where a part of the oleaginous matters crystallizes so that the emulsion may form the lighter phase comprising a liquid component and the heavier phase comprising the aqueous phase containing a solid component dispersed therein, separating the lighter phase from the heavier phase and further separating the solid component from the heavier phase.

It is preferable that the separating step is effected with the emulsion of the O/W type. In another preferable embodiment, the emulsifying step and the cooling step are effected with the emulsion of the W/O type and the separating step is effected with the emulsion of the O/W type. In a third preferable embodiment, the emulsifying step and the cooling step are effected with emulsion of the O/W type and the separating step is effected with the emulsion of the O/W type.

effect. Too large an amount of water is disadvantageous economically. The solid component is difficult to enter into the aqueous phase also when the wetting agent is used in too small an amount. Then too large an amount of the wetting agent will lead to an increased viscosity and a decreased separation extent, in addition to a high cost.

For the purpose of an effective separation into the liquid component and the solid component, it is useful that the emulsion has a low viscosity and water drops in the emulsion get together. Addition of a solvent may be helpful for this purpose.

The present inventors have made extensive and intensive studies on a method which enables simple separation of the water/oil emulsification product thickened in a creamy state into two phases, i.e., a lighter phase composed of the liquid component and a heavier phase composed of the aqueous phase containing the solid component suspended therein. As a result, the present inventors have found that sufficiently ripened (subjected to cohesion and growth) crystals causes no reassociation with the water droplets as the dispersed phase, i.e., no inclusion of the liquid component in the solid component and, therefore, causes neither lowering in the purity of the solid component nor lowering in the separation efficiency and that, consequently, the addition of water or an aqueous solution of a wetting agent to the water/oil emulsification product thickened in a creamy state for the purpose of causing a phase inversion into an oil/water emulsion system brings about the conversion of the aqueous phase into the continuous phase which not only causes a decrease in the viscosity of the system but also makes it easy to unite the oil droplets which have been converted into the dispersed phase and, therefore, leads to advantages such as simple separation into a lighter phase comprising the liquid component and a heavier phase containing the solid component suspended therein, freedom from the lowering in the purity of the solid component, and maintenance of excellent separation efficiency.

The above mentions that a desirable wetting agent is helpful to the phase inversion from the W/O type to the O/W. The wetting agent defined in the invention meets the requirement.

In the invention, both solid component and liquid component can be obtained at a time with a high quality and a high efficiency, compared with the conventional method using a wetting agent. This advantage is reached even when a solid component is contained at a high content.

In the invention using the specified wetting agent in the O/W type emulsion, crystals are formed in the continuous aqueous phase and are prevented from association with the dispersed oil drops. Moreover a creamy emulsion containing aged crystals and having an increased viscosity may be thinned by addition of water or an aqueous solution of a wetting agent and eventually improved in view of the subsequent separation. The invention is effectively worked even when the O/W type emulsion is cooled and crystallized and a solid content is higher than the case of the W/O type emulsion.

The wetting agent may be emulsified either with water after it is added to the oleaginous matter side or with the oleaginous matter in the form of an aqueous solution (or an aqueous dispersion).

Further, any inorganic electrolyte which is used in combination with the highly water-soluble surfactant having a high HLB value in the conventional wetting agent fractionation method may not be necessarily used in the wetting agent fractionation method which uses the wetting agent of the present invention.

In the present invention, it is important that the wetting agent be suitably balanced in respect of hydrophilicity and lipophilicity, i.e., have an HLB value of 5 to 12. However, there is no particular limitation with respect to the structure and length of the hydrophilic and the lipophilic groups. Examples of the wetting agent include glycerin fatty acid esters, polyglycerin fatty acid esters, sorbitol or sorbitan fatty acid esters, sucrose fatty acid esters, propylene glycol fatty acid esters and/or adducts thereof with polyoxyethylene, and polyoxyethylene alcohol ethers, though the wetting agent is not limited to these only.

The invention provides a solid product with as high a quality and as high a yield as the solvent fractionation method. In addition, with respect to the liquid product which is simultaneously obtained, the present inventors have found that the liquid component not only can be obtained in a yield higher than that of the liquid component obtained by the conventional wetting agent fractionation method but also has high quality, i.e. exhibits improved low-temperature resistance over the liquid component of the solvent fractionation method which is obtained in substantially the same yield as that of the present method.

Thus, the present inventors have found that the fractionation method of the present invention is not only superior in the separation efficiency to the conventional fractionation methods but also enables the fractionation of high-quality solid and liquid components, which led to the completion of the present invention.

The liquid palm oil very advantageously applies to the invention to obtain the below defined diglyceride. The results of the analyses revealed that the crystallization and solidification of liquid palm oil are promoted by diglyceride with two saturated fatty acids and diglyceride with one saturated fatty acid and one unsaturated fatty acid. It was also found that liquid palm oil is improved in storage stability at low temperatures when these high-melting diglycerides are removed.

Accordingly, it is an object of the present invention to provide an edible oil composition which comprises as the principal ingredient liquid fractionated palm oil containing less than 0.5 wt% of diglyceride with two saturated fatty acids and less than 6 wt% of diglyceride with one saturated fatty acid and one unsaturated fatty acid.

The liquid fractionated palm oil pertaining to the present invention should preferably be composed of the following glycerides.

Triglyceride with three saturated fatty acids ($S_3$): 0 to 0.3 wt%

Triglyceride with two saturated fatty acids and one unsaturated fatty acid ($S_2U$): 0 to 20 Wt%

Triglyceride with one saturated fatty acid and two unsaturated fatty acids ($SU_2$): 55 to 70 wt%

Triglyceride with three unsaturated fatty acids ($U_3$): 10 to 20 wt%

Diglyceride with two saturated fatty acids ($S_2$): 0 to 0.5 wt%

Diglyceride with one saturated fatty acid and one unsaturated fatty acid (SU): 0 to 6 wt%

Diglyceride with two unsaturated fatty acids ($U_2$): 3 to 10 wt%

According to the invention, the fractionation can be effected to obtain three or more fractions. The method for fractionating oleaginous matters into three or more fractions having different melting points from one another can be effected by repeating the steps as defined above, treating a fraction obtained in the last fractionation, changing the emulsifying temperature and the cooling temperature to suitable ones.

The invention is more advantageous when the oleaginous matters are substantially composed of triglycerides. In addition, the invention is preferably applied when the oleaginous matters are triglycerides composed of an interesterification product of fats and oils being solid or semi-solid at the room temperature or a blend of it with up to 50 percent by weight of a liquid animal or vegetable oil. In this method, the fats and oils are preferred to be palm oil or soybean oil.

From the practical point of view, the invention also provides a method as defined above, characterized by:

emulsifying oils and fats with said wetting agent and water at so high a temperature that said oils and fats may substantially melt, forming an emulsion of the W/O type, then effecting the cooling step with the emulsion of the W/O type, aging the cooled emulsion of the W/O type, adding a large amount of water or an aqueous solution of a salt to the emulsion to convert the W/O type to the O/W type and obtain the upper oily phase comprising a liquid component and the lower aqueous phase of a dispersion of a solid component in water, separating the lower phase from the upper one and further separating the solid component from the lower phase.

Moreover the invention provides a liquid oil containing 0.5 wt.% or less of diglycerides having two saturated fatty acid residues and 6 wt.% or less of diglycerides having one saturated fatty acid residues and one unsaturated fatty acid residue, having been obtained by the lighter phase obtained in the method as defined above, using triglycerides as the oleaginous matter. The most useful liquid oil is obtained when the triglycerides are a fractionated palm oil.

The invention includes the following four embodiments:

(1) A method of separating oleaginous matter into components having various melting points which comprises separating oleaginous matter comprising components having various melting points into two phases, i.e., a lighter phase comprising a liquid component and a heavier phase comprising a water phase containing a solid component suspended therein, by making use of a wetting agent and separating said solid component from said aqueous suspension phase, thereby separating starting oleaginous matter into components having different melting points from each other, characterized in that said wetting agent comprises a surfactant having an HLB value of 5 to 12, (2) A method of separating oleaginous matter into components having various melting points which comprises separating oleaginous matter comprising components having various melting points into two phases, i.e., a lighter phase comprising a liquid component and a heavier phase comprising an aqueous phase containing a solid component suspended therein, by making use of a wetting agent and separating said solid component from said aqueous suspension phase, thereby separating starting oleaginous matter into components having different melting points from each other, characterized in that a solid component which has been crystallized by precipitating, in crystalline form, part or the whole of said solid component in a water/oil emulsion system in the presence of a wetting agent is allowed to migrate and suspend into a dispersed phase comprised of water droplets, subjected to ripening (cohesion and growth) in said dispersed phase comprised of water droplets and then separated, (3) A process for producing a liquid oil superior in storage stability at low temperatures which comprises interesterifying a blend oil composed of 50 to 100 wt% of oil or fat which is solid or semi-solid at normal temperature and 50 to 0 wt% of liquid animal or vegetable oil, and subsequently fractionating the interesterified blend oil in an emulsion system in the presence of a wetting agent and (4) An edible oil composition which comprises as the principal ingredient liquid fractionated palm oil containing less than 0.5 wt% of diglyceride with two saturated fatty acids and less than 6 wt% of diglyceride with one saturated fatty acid and one unsaturated fatty acid.

In the invention, the crystallization by cooling of an emulsion is effectively conducted without prevention of the crystallization by a wetting agent contained in the emulsion. A separation extent is much improved in this respect.

In the invention of the wetting agent fractionation method which uses the wetting agent of the present invention, it is preferred that the cooling for crystallization be completed after the formation of an emulsion system through addition of the wetting agent and water in such a stage that no crystal or a small amount of crystal is present.

When the cooling for crystallization is conducted in an emulsion system, the crystal which has been precipitated on the oil phase side is immediately allowed to migrate into the aqueous phase side before it is grown to a large size and ripened in the aqueous phase, which reduces the amount of the liquid component included in the crystalline network. Thus, a high-quality solid component containing a smaller amount of the liquid component incorporated therein can be obtained in crystalline form.

The method according to the invention may be effected with either an O/W or W/O emulsion when the emulsion is prepared. On the separation step into the two phases, however, the O/W type emulsion is preferred for a high separation extent. This preferred separation step may be carried out after the initial emulsion is prepared of the O/W type and then cooled. Alternatively it may be conducted after the initial emulsion is of the W/O type, the cooling step for crystallization is followed as it is and then the emulsion is inversed to the O/W type by adding thereto water. This embodiment is advantageous because a smaller amount of a wetting agent is used.

When the emulsion is cooled and crystallized, a water content by volume in the composition of the emulsion is preferred to range between ½ and 2,000 times, more preferably 1 and 1,000 times, as high as a content of the solid component to separate from the oil component. The wetting agent or the emulsifier may be used in an amount of 1 to 50 wt.%, preferably 5 to 25 wt.%.

Too small an amount of water does not enable much of the solid component to transfer into the aqueous phase and therefore does not bring the invention to The triglyceride with three saturated fatty acids ($S_3$) denotes tripalmitin, dipalmitomonostearin, etc.; the triglyceride with two saturated fatty acids and one unsaturated fatty acid ($S_2U$) denotes dipalmitomonoolein, etc.; the diglyceride with two saturated fatty acids ($S_2$) denotes dipalmitin, palmitostearin, etc.; and the diglyceride with one saturated fatty acid and one unsaturated fatty acid (SU) denotes palmitoolein etc. These glycerides should preferably have such a composition that they yield fatty acids in amounts specified below.

Myristic acid ($C_{14}$): 0.5 to 2.0 wt%
Palmitic acid ($C_{16}$): 15 to 35 wt%
Stearic acid ($C_{18}$): 1.5 to 5 wt%
Oleic acid ($C_{18}F_1$): 40 to 60 wt%
Linoleic acid ($C_{18}F_2$): 10 to 20 wt%
Linolenic acid ($C_{18}F_3$): 0.5 to 2.0 wt%
Arachic acid ($C_{20}$): 0.1 to 1.0 wt%

Of the above-mentioned glycerides, those which play an important role in storage stability at low temperatures are diglyceride with two saturated fatty acids ($S_2$) and diglyceride with one saturated fatty acid and one unsaturated fatty acid (SU). With $S_2$ in an amount more than 0.5 wt% or with SU in an amount more than 6 wt%, the liquid fractionated oil is very poor in storage stability at low temperatures, with crystals separating out even at 20° C. For the liquid oil to have good storage stability at low temperatures, it is necessary that the content of $S_2$ should be less than 0.5 wt%, preferably less than 0.4 wt%, and the content of SU should be less than 6 wt%.

The edible oil composition of the present invention may be incorporated, in addition to liquid fractionated palm oil, with one or more than one kind of edible animal and vegetable oils in the liquid form having good storage stability at low temperatures, such as soybean oil, rapeseed oil, safflower oil, corn oil, and fish oil. The content of the liquid edible oils, excluding palm oil, should preferably be 0 to 30 wt% for 70 to 100 wt% of the liquid fractionated palm oil so that the palm oil retains its plain taste and heat stability. The edible animal and vegetable oils in the liquid form may be incorporated with palm oil before or after fractionation. Alternatively, it is possible to produce the edible oil composition of the present invention by incorporating palm oil with animal and vegetable oils for interesterification and subsequently performing fractionation.

The invention include a more preferred embodiment in which a starting oil and fat is treated in advance with interesterification. In this respect the invention provides a process for producing a liquid oil improved in storage stability at low temperatures which comprises interesterifying a blend oil composed of 50 to 100 wt% of oil or fat which is solid or semi-solid at normal temperature and 50 to 0 wt% of liquid animal or vegetable oil, and subsequently fractionating the interesterified blend oil in an emulsion system in the presence of a wetting agent. A preferred embodiment of the present invention comprises interesterifying palm oil or fractionated palm oil alone or a blend oil composed of more than 50 wt% of palm oil or fractionated palm oil and less than 50 wt% of liquid animal or vegetable oil and crystallizing the interesterified oil according to the invention method.

The oil and fat to use in this embodiment preferably includes palm oil, palm olein obtained by fractionation of palm oil and a blend oil composed of palm oil or palm olein and an animal or vegetable oil. The animal or vegetable oil is not specifically limited; but it may be selected from soybean oil, rapeseed oil, safflower oil, corn oil, etc. having good storage stability at low temperatures. They may be used alone or in combination with one another. The content of the animal or vegetable oil in the blend oil should be less than 50 wt%, preferably less than 30 wt%, so that the resulting liquid oil has palm oil's characteristics, plain taste and good heat stability.

The raw material oil undergoes interesterification for the purpose of increasing the amount of liquid oil component. The object of interesterification is to increase the ratio of the low-melting component or the liquid oil component by the indiscriminate rearrangement of fatty acid residues in the oil. It can be accomplished in any known manner such as chemical process and enzymatic process.

In the embodiment, it is possible to effectively produce a liquid oil superior in storage stability at low temperatures. For the further improvement of storage stability at low temperatures, the liquid oil produced by the process of the present invention may be incorporated with a crystallization suppressing agent. Such an agent is not specifically restricted. It includes glycerin fatty acid ester, sugar fatty acid ester, and sorbitan fatty acid ester, which may be used alone or in combination with one another. The crystallization suppressing agent may be added in an amount of 0.05 to 5 wt% to the liquid oil.

[EXAMPLES]

The present invention will now be described with reference to the following Examples which should not be construed as limiting the scope of the present invention. The "part(s)" and "%" in the examples are each on a weight basis.

EXAMPLES 1 AND 2

To 100 parts of a palm oil having an iodine value of 51 were added polyoxyethylene lauryl ether (a number of moles of addition of ethylene oxide of 4 in the case of Example 1 and 6 in the case of Example 2) in an amount as shown in Table 1 and then 50 parts of water. The resulting mixture was allowed to cool from 50° C. to 20° C. over a period of 10 hr while stirring for crystallization, followed by ripening at 20° C. for 5 hr to crystallize the solid component. While stirring, 150 parts of a 3% saline solution of 20° C. was added to the emulsified dispersion after the completion of the crystallization, and stirring was continued at 20° C. for additional 10 min. At this time, phase inversion to an oil/water emulsion system was caused. Then the emulsified dispersion was centrifuged into a lighter phase comprising a liquid component and an aqueous phase containing a crystallized solid component suspended therein, thereby obtaining the liquid component. The aqueous suspension phase was heated at 80° C. to melt the solid component, followed by centrifugation to obtain the solid component.

The yield and iodine value of the liquid and solid components thus obtained are shown in Table 1.

COMPARATIVE EXAMPLE 1

100 parts of the same palm oil as that used in Example 1 was allowed to cool from 50° C. to 20° C. over a period of 10 hr while stirring, followed by ripening at 20° C. for 5 hr to crystallize the solid component. 200 parts of a wetting agent solution (containing 0.3% by weight of sodium dodecyl sulfate and 3% by weight of magnesium sulfate) were added at 20° C. to the slurry oil containing crystals thus obtained, followed by sufficient mixing to obtain an emulsified dispersion. The emulsion system at that time was of an oil/water type. Then, in the same manner as that of Example 1, the emulsified dispersion was centrifuged into a lighter phase comprising a liquid component and an aqueous phase containing a crystallized solid component suspended therein, thereby obtaining the liquid component. The aqueous suspension phase was heated at 80° C. to melt the solid component, followed by centrifugation to obtain the solid component.

The yield and iodine value of the liquid and solid components thus obtained are shown in Table 1.

TABLE 1

| | kind of wetting agent | HLB | amount of addition (based on oil) | solid component yield | solid component iodine value | liquid component yield | liquid component iodine value |
|---|---|---|---|---|---|---|---|
| Ex. 1 | polyoxyethylene lauryl ether (number of moles of ethylene oxide: 4) | 8.5 | 3% | 19.5% | 28.8 | 80.7% | 56.3 |
| Ex. 2 | polyoxyethylene lauryl ether (number of moles of ethylene oxide: 6) | 10.8 | 5% | 18.7% | 28.4 | 81.3% | 56.2 |
| Comp. Ex. 1 | sodium dodecyl sulfate | 40 | 0.6% | 25.4% | 34.9 | 75.6% | 56.2 |

As can be seen from Table 1, each of Examples 1 and 2 wherein polyoxyethylene lauryl ethers respectively having HLB values of 8.5 and 10.8 were used as the wetting agent gave substantially the same iodine value of the liquid component as that of Comparative Example 2 wherein a conventional wetting agent, i.e., sodium dodecyl sulfate, was used but was superior in the yield of the liquid component to that of Comparative Example 1, and further provided a high-quality solid component having a low iodine value, i.e., is excellent in the separation efficiency.

EXAMPLE 3

To 100 parts of palm olein having an iodine value of 55 were added 3 parts of polyglycerin monooleate as the wetting agent and 50 parts of water. The resulting mixture was allowed to cool from 50° C. to 12° C. over a period of 10 hr while stirring for crystallization, followed by ripening at 12° C. for 5 hr to crystallize the solid component. The emulsion system at that time was of a water/oil type. While stirring, 150 parts of a 3% aqueous solution of magnesium sulfate was added at 12° C. to the emulsification product after the completion of the crystallization, followed by stirring at 12° C. for 10 min. At this time, phase inversion to an oil/water emulsion system was caused. Then the emulsified dispersion was centrifuged into a lighter phase comprising a liquid component and an aqueous phase containing a crystallized solid component suspended therein, thereby obtaining the liquid component. The aqueous suspension phase was heated at 80° C. to melt the solid component, followed by centrifugation to obtain the solid component.

The yield and iodine value of the liquid and solid components thus obtained are shown in Table 2.

EXAMPLE 4

To 100 parts of the same palm olein as that used in Example 3 were added 5 parts of glycerin monocaprylate having a purity of caprylic acid of 95 percent or higher a monoester content of about 90 percent and 50 parts of water. The obtained mixture was cooled from 50° C. down to 12° C. over a period of 10 hours, while stirred, for crystallization and then was allowed to age at 12° C. for 5 hours. At this point of time the emulsion was of the W/O type. 150 parts of 3% aqueous solution of magnesium sulfate kept at 12° C. was added to the crystallized emulsion, while stirred, and the mixture was further agitated at 12° C. for 10 mins. In this point of time, the phase inversion to the oil/water emulsion took place. The O/W type emulsion was centrifuged, in the same manner as shown in Example 3, to separate into the lighter phase comprising a liquid component and the aqueous phase containing a crystallized solid component suspended therein. Then the liquid component was taken out. The aqueous suspension phase was heated to 80° C. to melt the solid component and the solid component was obtained by centrifugation.

The yield and iodine value of the liquid and solid components thus obtained are shown in Table 2.

EXAMPLE 5

To 100 parts of the same palm olein as that used in Example 3 were added 20 parts of the glycerin monocaprylate as that use in example 4 and 200 parts of water. The resulting mixture was allowed to cool from 50° C. to 12° C. over a period of 10 hr, followed by ripening at 12° C. for 5 hr to crystallize the solid component. The emulsion system at that time was of an oil/water type. This emulsified dispersion was centrifuged in the same manner as that of Example 3, thereby obtaining an aqueous phase containing the liquid component and crystallized solid component suspended therein. The aqueous suspension phase thus obtained was heated at 80° C. to melt the solid component, followed by centrifugation to obtain the solid component.

The yield and iodine value of the liquid and solid components thus obtained are shown in Table 2.

COMPARATIVE EXAMPLE 2

100 parts of the same palm olein as that used in Example 3 was allowed to cool from 50° C. to 12° C. over a period of 10 hr, followed by ripening at 12° C. for 5 hr to crystallize the solid component. 200 parts of a wetting agent solution (containing 0.5% of sodium dodecyl sulfate and 3% of magnesium sulfate) were added at 12° C. to the slurry oil containing crystals thus obtained, followed by sufficient mixing to obtain an emulsified dispersion. The emulsion system at that time was of an oil/water type. Then the emulsified dispersion was centrifuged in the same manner as that of Example 3 to obtain an aqueous phase containing the liquid component and the solid component suspended therein. The aqueous suspension phase thus obtained was heated at 80° C. to melt the solid component, followed by centrifugation to obtain the solid component.

The yield and iodine value of the liquid and solid components thus obtained are shown in Table 2.

EXAMPLE 6

Five parts of glycerin monocaprylate, used in Example 4, and 200 parts of water were added to 100 parts of palm olein, used in Example 3, and the mixture was cooled from 50° C. down to 12° C. over a period of 10 hours, while agitated, to conduct crystallization. It was further allowed to age at 12° C. for 5 hours. At this point of time, it was found to be of the oil/water type emulsion. The emulsion was centrifuged in the same way as shown in Example 3 to form the lighter phase of a liquid component and the aqueous phase having a solid component dispersed therein separately. The liquid phase was taken out. The aqueous dispersion was heated up to 80° C. to melt the solid component. The solid component was obtained by centrifuging the dispersion. Both liquid and solid components were examined in view of a yield and an iodine value. Results are shown in Table 2.

COMPARATIVE EXAMPLE 3

200 parts of acetone was added to 100 parts of the same palm olein as that used in Example 3 and homogeneously dissolved therein at 40° C. The resulting solution was allowed to cool from 40° C. to 6° C. over a period of 15 hr, followed by ripening at 6° C. for 2 hr to crystallize the solid component. The precipitated crystals were separated by filtration. The crystalline portion was washed with 50 parts of acetone of 6° C. and then recovered, followed by removal of the solvent to obtain the solid component. The filtrate obtained by filtration of the crystalline portion and the filtrate obtained by the washing were mixed with each other, followed by removal of the solvent to obtain the liquid component.

The yield and iodine value of the liquid and solid components thus obtained are shown in Table 2.

TABLE 2

| | kind of wetting agent | HLB | amount of addition (based on oil) | solid component yield | solid component iodine value | liquid component yield | liquid component iodine value |
|---|---|---|---|---|---|---|---|
| Ex. 3 | polyglycerin monooleate | 8 | 3% | 38.8% | 40.7 | 61.2% | 64.1 |
| Ex. 4 | glycerin monocaprylate | 6.5 | 5% | 33.5% | 35.0 | 66.5% | 65.0 |
| Ex. 5 | " | 6.5 | 20% | 33.1% | 35.4 | 66.9% | 64.7 |
| Ex. 6 | glycerin monocaprylate | 6.5 | 5% | 46.6% | 43.9 | 53.4% | 64.7 |
| Comp. Ex.2 | sodium dodecyl sulfate | 40 | 1.0% | 51.9% | 46.3 | 48.1% | 64.4 |
| Comp. Ex. 3 | solvent fractionation | — | — | 32.9% | 35.0 | 67.1% | 64.8 |

As can be seen from Table 2, each of Examples 3, 4, and 5 wherein polyglycerin monooleate having an HLB value of 8 and glycerin monocaprylate having an HLB value of 6.5 were used as the wetting agents gave substantially the same iodine value of the liquid component as that of Comparative Example 2 wherein a conventional wetting agent, i.e., sodium dodecyl sulfate, was used, but was superior in the yield of the liquid component to that of Comparative Example 2 and gave a lower iodine value of the solid component than that of Comparative Example 2, and the quality and the yield of the solid component of these examples were substantially the same as those of the solid component obtained by the solvent fractionation method of Comparative Example 3. In this example, the wetting agent was used at a lower content than in Examples 4 and 5. For this reason the separation efficiency was found to get lower, but higher in Example 6 than Comparative Example 2.

EXAMPLE 7

The liquid component was found to be a palm olein having an IV of 65.0 and the following composition and was here fractionated.

S, 0.5%, $S_2U$ 30.2%, $SU_2$ 49.9%, $U_3$ 9.5%, $S_2$ 0.9%, SU 5.5%, $U_2$ 3.5%.

To 100 parts of the palm oil were added 5 parts of glycerin monocaprylate and 50 parts of water. The mixture was cooled with stirring from 30° C. to 3° C. over a period of 10 hours. The mixture was further aged at 3° C. for 5 hours to effect crystallization of high-melting components. To the emulsion, which had undergone crystallization, was added 150 parts of water with stirring at 3° C. The mixture was stirred at 3° C. for 10 minutes to bring about phase inversion from W/O emulsion into O/W emulsion. Emulsified dispersed particles were centrifugally separated to divide the mixture into a light layer composed of liquid components and an aqueous layer in which crystallized high-melting components are suspended. Thus there was obtained 68.8 parts of the desired liquid component. The aqueous layer in which crystallized high-melting components are suspended was heated to 80° C. to melt the high-melting components and subsequently subjected to centrifugal separation. Thus there was obtained 29.7 parts of high-melting components. Table 3 shows the yield, iodine value, and composition of the thus obtained liquid component and solid (high-melting) component.

Then the liquid component was decolored and deodorized in the usual way and examined in view of the storage stability at low temperatures of 0° C. and 5° C. by using the following cold test. Results are shown in Table 4.

Cold Test

An oil sample (70 g) is heated in a 100-ml bottle (50 mm in inside diameter) at 120° C. for 5 minutes, and the sample is allowed to stand at 20° C. for 1 hour. The sample bottle, with the mouth tightly stoppered, is immersed in a constant temperature water bath at a prescribed temperature. The sample oil is observed at constant time intervals and the time required for the sample oil to become cloudy or produce crystals is recorded.

COMPARATIVE EXAMPLE 4

One hundred parts of the liquid component of the same as used in Example 7 was dissolved in 200 parts of acetone uniformly. Then the obtained solution was cooled with stirring from 30° C. to −5° C. and aged with stirring at −5° C. for 5 hours to crystallize the high-melting components. The suspension of crystals was filtered under reduced pressure. The collected high-melting crystals were washed twice with 20 parts of fresh acetone at −5° C. After removal of acetone, there was obtained 29.2 parts of solid (high-melting) component. The filtrate was combined with the washings. Upon removal of acetone by distillation, there was obtained 69.8 parts of liquid component. Table 1 shows the yield, iodine value, and composition of the thus obtained liquid component and solid (high-melting) component.

Then the obtained liquid component was examined in view of the storage stability in the same way as shown in Example 7. Results are shown in Table 4.

TABLE 4

| Example | Liquid component / Solid component | Yield[1] (%) | IV | Oil composition (wt %)[2],[3] $S_3$ | $S_2U$ | $SU_2$ | $U_3$ | $S_2$ | SU | $U_2$ |
|---|---|---|---|---|---|---|---|---|---|---|
| Example 7 | Liquid component | 68.8 | 72.6 | 0.1 | 13.5 | 63.6 | 13.3 | 0.3 | 4.6 | 4.6 |
| | Solid component | 29.7 | 47.8 | 1.6 | 69.2 | 19.1 | 0.4 | 2.3 | 7.2 | 0.2 |
| Comparative Example 4 | Liquid component | 69.8 | 72.3 | 0.1 | 12.5 | 62.6 | 12.2 | 0.8 | 6.7 | 5.1 |
| | Solid component | 29.2 | 47.6 | 1.7 | 72.3 | 21.5 | 0.3 | 1.4 | 2.6 | 0.2 |

Note 1. Yield is based on the amount of raw materials charged

Note 2. $S_3$ denotes triglyceride with three saturated fatty acids.

$S_2U$ denotes triglyceride with two saturated fatty acids and one unsaturated fatty acid.

$SU_2$ denotes triglyceride with one saturated fatty acid and two unsaturated fatty acids.

$U_3$ denotes triglyceride with three unsaturated fatty acids.

$S_2$ denotes diglyceride with two saturated fatty acids.

SU denotes diglyceride with one saturated fatty acid and one unsaturated fatty acid.

$U_2$ denotes diglyceride with two unsaturated fatty acids.

Note 3. The composition of diglyceride was determined by high-performance liquid chromatography under the following conditions.

(i) Sample preparation

An accurately weighed sample (50 to 100 mg) was dissolved in 2 ml of 2% solution of 3,5-dinitrobenzoyl chloride in DMF and 100 ml of triethylamine, followed by heating at 70° C. for 30 minutes.

(ii) Liquid chromatography

Column size: 4.0 mm (dia.) by 250 mm

Column packing material: Reversed phase system (Hitachi gel)

Eluent: $CH_3CN/H_2O=96/4$

Flow rate: 1.5 ml/min

Column temperature: 40° C.

Detector: UV 254 nm

Amount of sample solution injected: 10 μl

TABLE 4

| | cold test (days) at 0° C. | at 5° C. |
|---|---|---|
| example 7 | 3.5 | 6 |
| comparative example 4 | shorter than 0.1 | 0.5 |

It is noted from the data of Table 3 that Example 7 provided both resulting solid and liquid components with the same yield and iodine value as Comparative Example 4 conducted by the solvent fractionation. It is noted, however, that Example 7 provided the resulting triglyceride composition with less amounts of diglycerides having two saturated fatty acid residues and diglycerides having one saturated fatty acid residue and one unsaturated fatty acid residue than Comparative Example 4. The diglycerides have a high melting point and eventually have a bad influence on the storage stability at low temperatures. It is noted that Example 7 and Comparative Example 4 provided their products with almost the same composition of triglycerides as each other. This way it is understood that the invention method of the fractionation using a wetting agent can effectively remove high melting point-having diglycerides.

It is further noted from the data of Table 4 that Comparative Example 4 did not provide the product with a good storage stability at low temperatures of 0° C. and 5° C. On the other hand, Example 7 provided the liquid component with an improved result in this respect.

EXAMPLE 8

100 parts of palm olein was interesterified in the usual way by the aid of 0.1 wt% of sodium methylate as a catalyst, to give 98.5 parts of interesterified oil. To 98.5 parts of the interesterified oil were added 7.9 parts of glycerine monocaprylate and 74 parts of water to form a water/oil emulsion. The emulsion was cooled with stirring from 50° C. to 5° C. over a period of 10 hours, followed by aging at 5° C. for 5 hours for the crystallization of high-melting components. To the emulsion which had undergone the crystallization step was added 220 parts of water at 5° C. By stirring at 5° C. for 10 minutes, the emulsion was inverted from the water/oil system to the oil/water system. After the phase inversion, the emulsion was centrifugally separated into a light layer of liquid component and an aqueous layer in which crystals of high-melting components are suspended. Thus there was obtained 59.5 parts of the desired liquid oil. The water layer in which crystals of high-melting components are suspended was heated to 80° C. to melt the high-melting components and then the centrifugal separation was carried out again. Thus there was obtained 37.7 parts of high-melting components. The thus obtained liquid oil was bleached and deodorized in the usual way and then examined for the storage stability at low temperatures in the same manner as shown in Example 7. Results are show in Table 5.

EXAMPLE 9

One hundred parts of blend oil composed of 70 parts of palm oil and 30 parts of rapeseed oil was interesterified in the usual way by the aid of 0.1 wt% of sodium methylate as a catalyst, to give 98.3 parts of interesterified oil. To 98.3 parts of the interesterified oil were added 6 parts of glycerine monocaprylate and 60 parts of water to form a water/oil emulsion. The emulsion was cooled with stirring from 50° C. to 5° C. over a period of 10 hours, followed by aging at 5° C. for 5 hours for the crystallization of high-melting components. To the emulsion which had undergone the crystallization step was added 180 parts of water at 5° C. By stirring at 5° C. for 10 minutes, the emulsion was inverted from the water/oil system to the oil/water system. After the phase inversion, the emulsion was centrifugally separated into a light layer of liquid component and an aqueous layer in which crystals of high-melting components are suspended. Thus there was obtained 70.9 parts of the desired liquid oil. The water layer in which crystals of high-melting components are suspended was heated to 80° C. to melt the high-melting components and then the centrifugal separation was carried out again. Thus there was obtained 25.5 parts of high-melting components. The thus obtained liquid oil was bleached and deodorized in the usual way and then examined for the storage stability at low temperatures in the same way as in Example 7. Results are shown in Table 5.

EXAMPLE 10

Eight parts of glycerine monocaprylate and 75 parts of water were added to 100 parts of palm olein, the same as shown in Example 8, to form an O/W emulsion. It was cooled with stirring from 50° C. to 5° C. over a period of 15 hours, followed by aging at 5° C. for 5 hours for the crystallization of high-melting components. To the emulsion which had undergone the crystallization step was added 250 parts of water at 5° C. By stirring at 5° C. for 10 minutes, the emulsion was inverted from the water/oil system to the oil/water system. After the phase inversion, the emulsion was centrifugally separated into a light layer of liquid component and an aqueous layer in which crystals of high-melting components are suspended. Thus there was obtained 46.9 parts of liquid oil. The water layer in which crystals of high-melting components are suspended was heated to 80° C. to melt the high-melting components and then the centrifugal separation was carried out again. Thus there was obtained 51.2 parts of high-melting components. The thus obtained liquid oil was bleached and deodorized in the usual way and then examined for storage stability at low temperatures by the cooling test in the same way as shown in Example 7. Results are shown in Table 5.

EXAMPLE 11

One hundred parts of palm olein, the same as shown in Example 8, was interesterified in the usual way by the aid of 0.1 wt% of sodium methylate as a catalyst, to give 98.5 parts of interesterified oil. To 98.5 parts of the interesterified oil was added 197 parts of acetone to give a uniform solution. The solution was cooled with stirring from 40° C. to −5° C. over a period of 6 hours, followed by aging at −5° C. for 5 hours for the crystallization of high-melting components. The suspension of crystals was filtered under reduced pressure to separate the crystals of high-melting components. The crystals of high-melting components were washed twice with 20 parts of fresh acetone at −5° C. After the removal of acetone, there was obtained 36.7 parts of high-melting components. The filtrate was combined with the washings. Upon removal of acetone by distillation, there was obtained 61.3 parts of liquid component. The thus obtained liquid oil was bleached and deodorized in the usual way and then examined for storage stability at low temperatures in the same way as in Example 7. Results are shown in Table 5.

EXAMPLE 12

To 100 parts of a blend oil composed of 70 parts of palm oil, the same as shown in Example 8, and 30 parts of rapeseed oil were added 6 parts of glycerine monocaprylate and 60 parts of water to form a water/oil emulsion. The emulsion was cooled with stirring from 50° C. to 5° C. over a period of 10 hours, followed by aging at 5° C. for 5 hours for the crystallization of high-melting components. To the emulsion which had undergone the crystallization step was added 180 parts of water at 5° C. By stirring at 5° C. for 10 minutes, the emulsion was inverted from the water/oil system to the oil/water system. After the phase inversion, the emulsion was centrifugally separated into a light layer of liquid component and an aqueous layer in which crystals of high-melting components are suspended. Thus there was obtained 64.3 parts of liquid oil. The water layer in which crystals of high-melting components are suspended was heated to 80° C. to melt the high-melting components and then the centrifugal separation was carried out again. Thus there was obtained 34.2 parts of high-melting components. The thus obtained liquid oil was bleached and deodorized in the usual way and then examined for storage stability at low temperatures in the same way as shown in Example 7. Results are shown in Table 5.

TABLE 5

| | Examples | | | | |
|---|---|---|---|---|---|
| | 8 | 9 | 10 | 11 | 12 |
| yield of liquid oil (%) | 59.5 | 70.9 | 46.8 | 61.3 | 64.3 |
| cold test at 5° C. (days) | 7 | 14 | 6 | 0.5 | 8 |

It is noted from the data of Table 5 that the invention method using a wetting agent provides as high a separation extent as the solvent fractionation method. But the invention can be effected at a lower cost than the solvent fractionation and with an improvement in view of the storage stability at low temperatures and yield of the liquid oil.

What is claimed is:

1. A method of fractionating an oleaginous material into two fractions having different melting points, comprising the steps of:

emulsifying said oleaginous material with water using, as an emulsifier, a surfactant having an HLB value of from 5 to 10 at a temperature effective to melt substantially all of said oleginous material, whereby an emulsion is formed;

then cooling said emulsion to a crystallization temperature at which one of said fractions is crystallized while the other fraction of said oleaginous material is maintained molten so that said emulsion comprises an oil phase containing said other fraction and an aqueous phase containing crystals of said one fraction dispersed therein;

separating said oil phase from said aqueous phase;

and then removing said crystals of said one fraction from said aqueous phase.

2. A method as claimed in claim 1, in which said separating step is effected with an emulsion of the O/W type.

3. A method as claimed in claim 1, in which said emulsifying step and said cooling step are effected with an emulsion of the W/O type and said separating step is effected with an emulsion of the O/W type.

4. A method as claimed in claim 1, in which said emulsifying step and said cooling step are effected with an emulsion of the O/W type and said separating step is effected with an emulsion of the O/W type.

5. A method as claimed in claim 1 in which said emulsion contains from ½ to 2000 parts by volume of water per 1 part by volume of said one fraction, and said emulsion also contains from 1 to 50 wt.% of said surfactant, based on the weight of said oleaginous material.

6. A method as claimed in claim 5 in which said surfactant has an HLB value of from 6 to 10.

7. A method of fractionating an oleaginous material into three fractions having different melting points, comprising the steps of:

emulsifying said oleaginous material with water using, as an emulsifier, a surfactant having an HLB value of from 5 to 10 at a temperature effective to melt substantially all of said oleoginous material, whereby a first emulsion is formed;

then cooling said first emulsion to a first crystallization temperature at which a first fraction is crystallized while the remainder of said oleaginous material is maintained molten so that said emulsion comprises a first oil phase containing the remainder of said oleaginous material and a first aqueous phase containing crystals of said first fraction dispersed therein;

separating said first oil phase from said first aqueous phase;

then removing said crystals of said first fraction from said first aqueous phase;

at a temperature effective to melt substantially all of said remainder of said oleaginous material, emulsifying said first oil phase with water and using, as an emulsifier, a surfactant having an HLB value of from 5 to 12 whereby to form a second emulsion;

then cooling said second emulsion to a second crystallization temperature at which a second fraction is crystallized while the third fraction of said oleaginous material is maintained molten so that said second emulsion comprises a second oil phase containing said third fraction and a second aqueous phase containing crystals of said second fraction dispersed therein;

separating said second oil phase from said second aqueous phase;

and then removing said crystals of said second fraction from said second aqueous phase.

8. A method as claimed in claim 1 or claim 7, in which said oleaginous material is substantially composed of triglycerides.

9. A method as claimed in claim 1 or claim 7, in which said oleaginous material is triglycerides composed of an interesterification product of fats and oils which are solid or semi-solid at room temperature or a blend of said interesterification product with up to 50 percent by weight of a liquid animal or vegetable oil.

10. A method as claimed in claim 9, in which said oil is palm oil or soybean oil.

11. A method of fractionating an oleaginous material into two fractions having different melting points, comprising the steps of:

emulsifying said oleaginous material with water using, as an emulsifier, a surfactant having an HLB value of from 5 to 10 at a temperature effective to melt substantially all of said oleoginous material, whereby a W/O emulsion is formed;

then cooling said W/O emulsion to crystallization temperature at which one of said fractions is crystallized while the other fraction of said oleaginous material is maintained molten so that said W/O emulsion comprises an oil phase containing said other fraction and an aqueous phase containing crystals of said one fraction dispersed therein;

then aging the cooled W/O emulsion to cause cohesion and growth of said crystals;

then adding a large amount of water or an aqueous solution of a salt to said W/O emulsion to transform said W/O emulsion into a O/W emulsion comprised of an oil phase containing said other fraction and an aqueous phase which is a dispersion of said first fraction in water, separating said oil phase from said aqueous phase;

and then removing said crystals of said one fraction from said aqueous phase.

12. A method of fractionating a triglyceride mixture into first and second fractions having different melting points, comprising the steps of:

adding water and a surfactant having an HLB value of from 5 to 10 to said triglyceride mixture, and emulsifying them at a first temperature effective to melt said triglyceride mixture whereby to form an emulsion containing an oil phase and an aqueous phase, said emulsion containing from ½ to 2000 parts by volume of water per one part by volume of said first fraction and from 1 to 50 wt.% of said surfactant, based on the weight of said triglyceride mixture, said emulsion being free of crystals;

then cooling said emulsion to a second temperature effective to crystallize said first fraction and simultaneously stirring said emulsion whereby crystals of said first fraction precipitate in said oil phase and then immediately migrate to said aqueous phase;

then maintaining said emulsion at said second temperature to effect cohesion and growth of said crystals in said aqueous phase;

then separating said oil phase from said aqueous phase by centrifugal separation;

and then removing the crystals of said first fraction from said aqueous phase.

13. A method as claimed in claim 12 in which said emulsion is a W/O emulsion and including the step of adding and mixing a large quantity of water or an aqueous solution of a salt or a wetting agent with said W/O emulsion after said maintaining step and before said separating step in order to transform said W/O emulsion into an O/W emulsion.

14. A method as claimed in claim 12 in which said emulsion is an O/W emulsion and it is maintained as an O/W emulsion until said separating step.

* * * * *